April 14, 1931.     G. H. REMPES     1,800,264
TOOL SOCKET
Filed Jan. 27, 1928
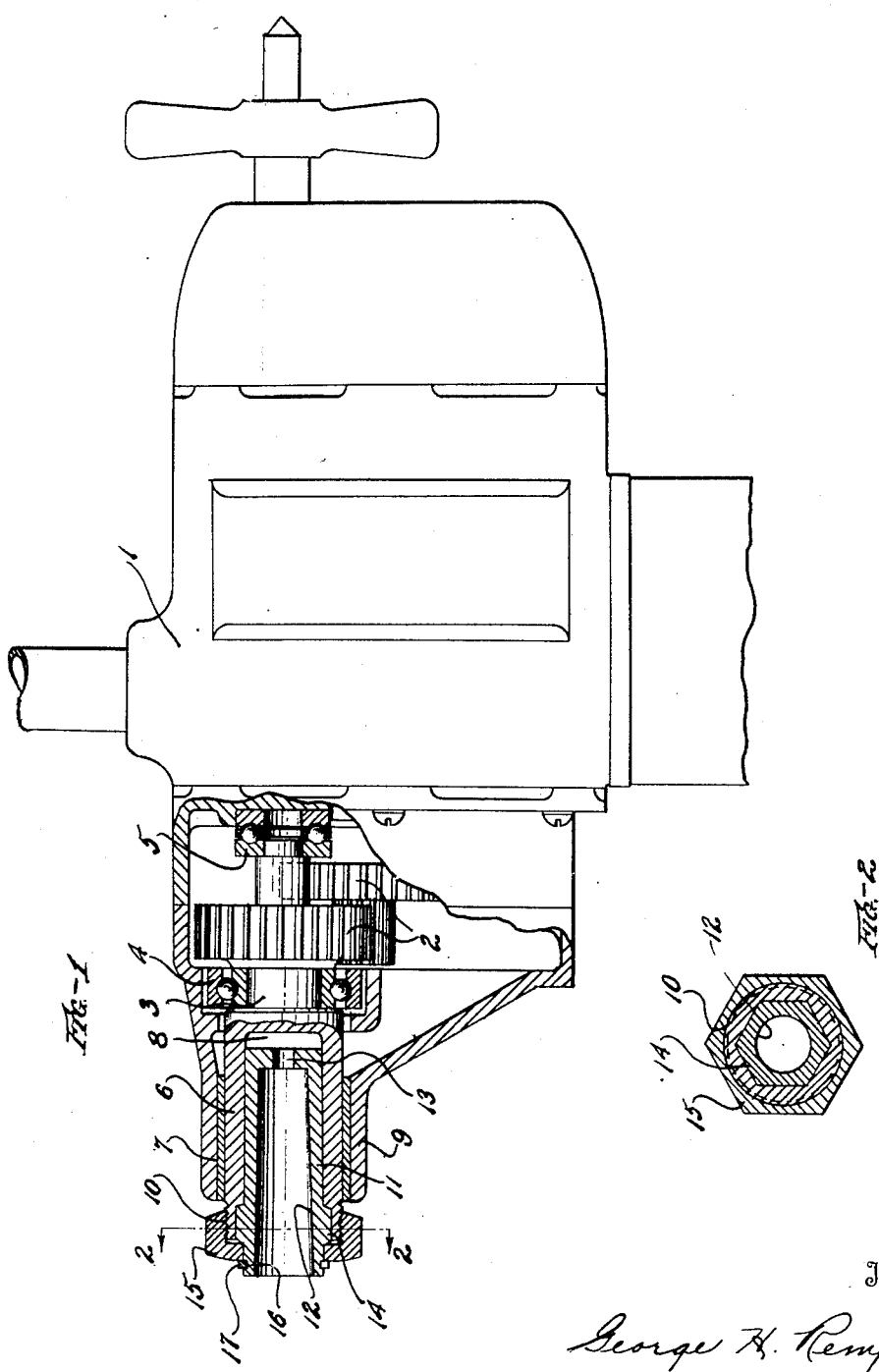
Inventor
George H. Rempes
By Brockett & Hyde
Attorneys Patented Apr. 14, 1931

1,800,264

UNITED STATES PATENT OFFICE

GEORGE H. REMPES, OF CLEVELAND HEIGHTS, OHIO, ASSIGNOR TO THE VAN DORN ELECTRIC TOOL COMPANY, OF CLEVELAND, OHIO, A CORPORATION OF OHIO

TOOL SOCKET

Application filed January 27, 1928. Serial No. 249,932.

This invention relates to tool sockets, and more particularly to sockets for portable tools, such as portable electric drills and the like.

The object of the invention is to provide a simple form of tool socket embodying a seat in the portable tool and a tool holder cooperating therewith, the latter comprising a self-contained unit provided with the necessary parts for coupling it with its seat by a simple operation and for removing it without danger of injury to other parts, all for purposes which will more fully hereinafter appear.

In the drawings Fig. 1 is an elevation, partly broken out and in longitudinal section, of one form of portable tool embodying the invention; and Fig. 2 is a detail cross sectional view, on the line 2—2, Fig. 1.

While the invention is adapted for use on any kind of machine tool, it is more particularly adapted for portable tools such as the electric drill shown in the drawings. The latter comprises a suitable casing 1 containing a driving motor (not shown), such as an electric or air motor, which, through suitable reduction gearing 2, rotates the spindle 3 journalled in the casing, such as by the radial and thrust bearings 4, 5. The forward end of the spindle is recessed to form a sleeve 6 rotating in a bushing 7 and having a cylindrical socket or seat 8, its outer end projecting from the nose 9 of the casing, where it is provided with the external threads 10.

The cylindrical opening 8 forms a seat to receive a tool holder comprising a cylindrical body member 11 closely fitting the socket or seat and provided with a tool receiving chamber of suitable form, such as the taper recess 12 terminating at its bottom in a slot 13 for the usual tool tang. A portion of the tool holder is made non-circular, such as by providing it with the hexagonal enlargement 14 fitting a corresponding recess or seat at the mouth of the sleeve 6 to form a driving connection. Beyond the hexagonal portion 14 the tool holder has swivelled thereto a nut 15 screwed upon the threads 10. Any suitable swivel connection may be provided, and in the present form the tool holder is provided outwardly of the hexagonal portion 14 with an annular groove 16 in which is rolled or pressed, and thereby permanently assembled, the split ring 17.

Such portable tools as that described could obviously be provided with tool spindles having the usual Morse taper socket, but such a socket requires a lateral opening at its back for the drift pin. It is usually inconvenient and impractical to provide for drift pin operation in these portable tools. Therefore, it is necessary or preferable to provide a cylindrical tool holder in which the Morse taper seat or other tool receiving seat may be located. The present invention does away with the objections to prior cylindrical tool holders, which are likely to become jammed or stuck in their seats because of dirt, foreign matter, rust or corrosion, in which case the workman is accustomed to hammer laterally on the outer end of the tool holder and frequently damages the outer end of the spindle or even the casing or jacket.

In the present construction, the tool holder is a unitary assembly including the body 11 and the nut 15 permanently swivelled thereto, so that the parts of the tool holder do not become detached from each other and are not likely to be lost. The holder is readily applied and secured to the portable tool by screwing up the nut 15, and even if it sticks or jams, can be removed from its seat by reverse operation of the nut 15 and the consequent pressure upon the ring 17.

The device is particularly useful in performing a series of operations with the same portable tool by employing distinct cutting tools, such as a series of reamers, in which case the portable tool may be equipped with a plurality of duplicate tool holders 11, one for each of the separate reamers or other tools, which can be readily interchanged in the portable tool by detachment and attachment of their respective tool holders thereto. Other advantages of the invention will be apparent to those skilled in the art.

What I claim is:

1. In a tool of the character described, a tool casing having a tubular extension, a spindle having an inner portion mounted within said casing extension and an outer portion projecting outwardly therebeyond, said outer projecting portion being externally threaded and both spindle portions being of tubular form to provide a tool holder socket, said socket having an enlarged noncircular driving seat at its outer end, a tool holder having an outer portion lying outside of said spindle and an inner portion lying inside of and fitting said spindle socket, said tool holder inner portion being provided at its outer end with an enlarged noncircular driving part fitting the enlarged noncircular driving seat of said socket, the engagement of said tool holder driving part with said spindle socket seat limiting inward movement of said tool holder relative to said spindle, and a nut rotatably secured on the outer portion of said tool holder for threaded connection to the threaded outer projecting portion of said spindle, whereby said tool holder is releasably secured to said spindle, said tool holder being provided with a tapered tool receiving cavity.

2. In a structure as set forth in claim 1 characterized in that the nut on the outer portion of the tool holder is arranged between two spaced abutments, one of which is formed by the non-circular driving part of the tool holder.

3. In a structure as set forth in claim 1 characterized in that the nut on the outer portion of the tool holder is arranged between two spaced abutments, the inner one of which is formed by the non-circular driving part of the tool holder, and the outer one of which is formed by a split ring seating in an annular recess of the tool holder outer portion.

In testimony whereof I hereby affix my signature.

GEORGE H. REMPES.